United States Patent

[11] 3,629,904

| [72] | Inventors | Ben P. Zober<br>1364 S. Edgewater Drive, Charleston, S.C. 29407;<br>Arthur G. Teston, Jr., P. O. Box 181, Hollywood, S.C. 29449 |
|---|---|---|
| [21] | Appl. No. | 884,463 |
| [22] | Filed | Dec. 12, 1969 |
| [45] | Patented | Dec. 28, 1971 |

[54] SHRIMP-DEHEADING MACHINE
5 Claims, 2 Drawing Figs.

| [52] | U.S. Cl. | 17/71, 17/48 |
|---|---|---|
| [51] | Int. Cl. | A22c 29/00 |
| [50] | Field of Search | 17/71, 73, 63, 48 |

[56] References Cited

UNITED STATES PATENTS

| 1,367,546 | 2/1921 | Hirth et al. | 17/71 |
| 2,784,450 | 3/1957 | Jonsson | 17/48 |
| 2,799,043 | 7/1957 | Walker | 17/63 |
| 3,528,125 | 9/1970 | Jones, Jr. | 17/48 |

*Primary Examiner*—Lucie H. Laudenslager
*Attorney*—T. Russell Foster

ABSTRACT: A shrimp-deheading machine comprising a plurality of troughlike receptacles supported in an endless row to successively receive shrimp to be deheaded and with which is associated shrimp head severing means and shrimp-retaining means movable into and out of each of the advancing receptacles successively for retaining engagement with the shrimp in each receptacle as the head is severed from the shrimp by the severing means.

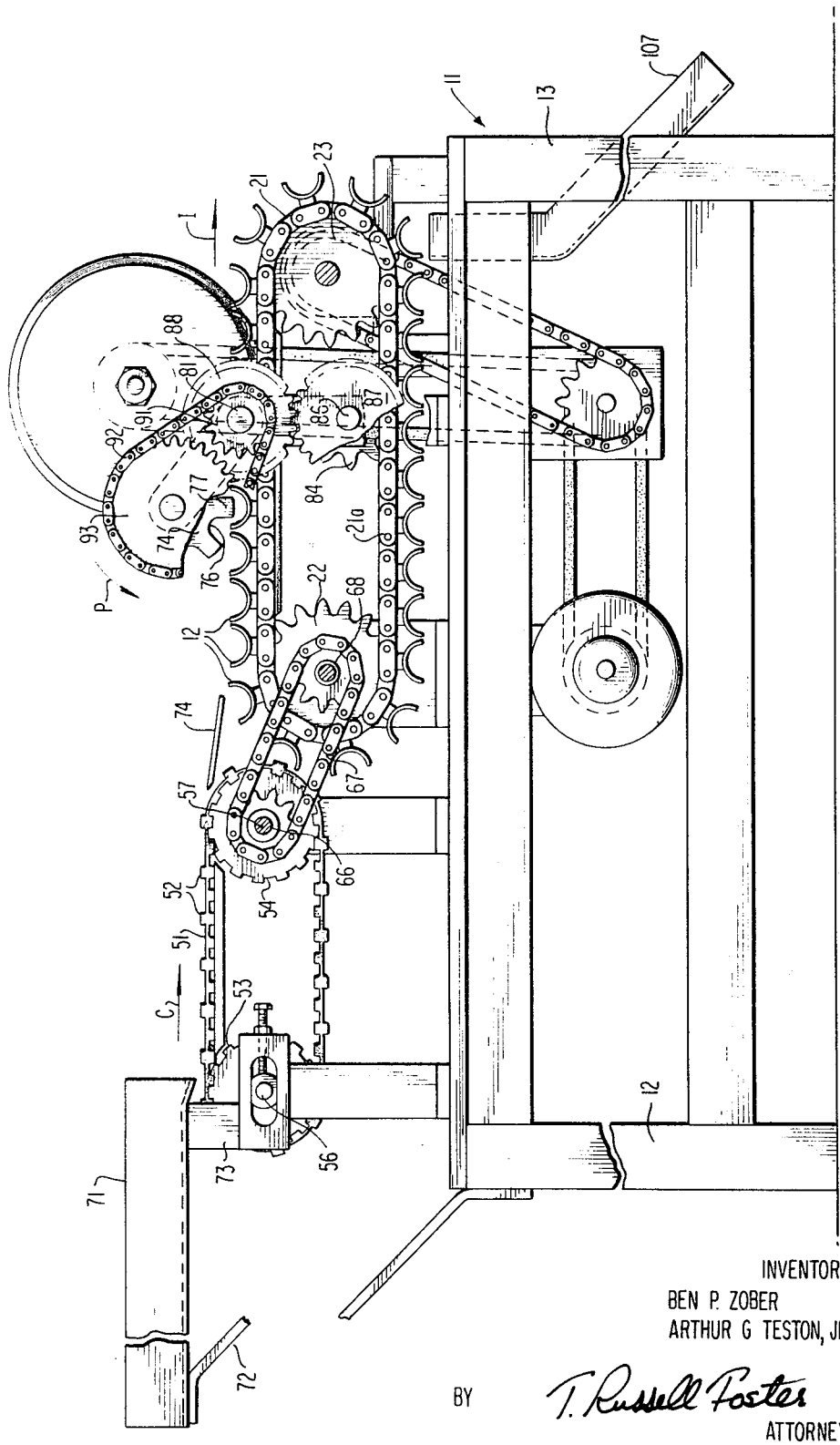

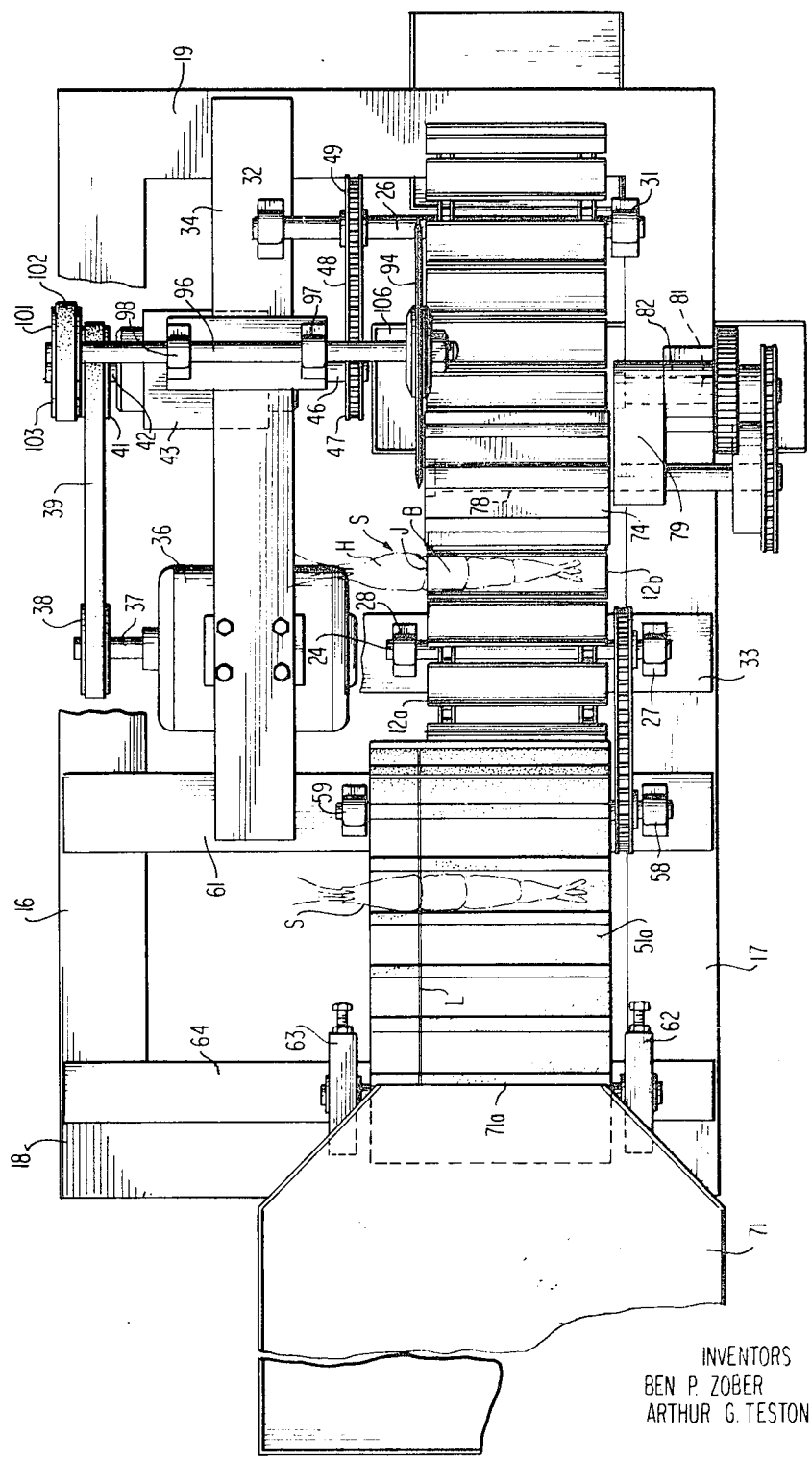

SHRIMP-DEHEADING MACHINE

This invention relates to shrimp-processing apparatus and more particularly to a machine for cutting off the heads of shrimp.

In the processing of shrimp for ultimate consumption by the consumer, one of the initial operations is the removal of the heads from the shrimp, the heads being of virtually no value. It has been common practice in the past, with the ready availability of manual labor and the requirement that some skill be exercised in separating the head from the tail or body portion of the shrimp, to remove shrimp heads by hand. With the rapidly diminishing availability of manual labor, the need for machine deheading of shrimp is becoming more and more critical. While many machines have been proposed in the past for shrimp deheading using techniques such as cutting, roll pinching, etc., such machines generally did not function with the desired degree of success due to limitations of one type or another. For instance, in some machines removal of the shrimp head was accompanied by mutilation of the body or edible portion of the shrimp. In other machines the wide variety in shape and size of shrimp in the typical catch limited the ability of the machine to accurately dehead resulting in removal of an excessive amount of body portion or the failure to completely remove all of the head. In addition, deheading of all of the shrimp processed in such machines was generally not obtained with resultant waste and/or additional processing cost and the production rate of such deheading machines fell far below that level at which such machines could be considered to be of economic benefit.

Accordingly, a primary object of this invention is to provide a new and novel machine for deheading shrimp.

Another object of this invention is to provide new and novel machine for deheading shrimp throughout a wide range of size and shape and at a high rate of production.

Still another object of this invention is to provide new and novel shrimp-deheading machine which removes the shrimp head from the body portion at the optimum position on the joint between the head and body portion and without mutilation of the body portion.

This invention further contemplates the provision of a new and novel shrimp-deheading machine which is of lightweight construction so as to be readily portable to a position of use, which may be operated by a relatively unskilled operator and which is rugged and durable in construction so as to be capable of prolonged use without breakdown.

Other objects and advantages of the invention will become apparent from the following description taken in connection with the accompanying drawings.

In general, the objects of this invention and other related objects are accomplished by providing a plurality of upwardly opening troughlike receptacles supported on supporting means in an endless row and in parallel, side by side relationship. Means are provided for continuously advancing the supporting means to move the receptacles successively between an upright shrimp receiving position and an inverted discharge position. Shrimp are deposited by shrimp-depositing means in each of he receptacles successively during the advance of the receptacles in the upright position with the head of each shrimp extending laterally outward from the open end of the associated receptacle. Means are provided for severing the heads from the shrimp deposited in the receptacles and means are associated with the receptacles for movement into and out of each of the receptacles successively and in timed relationship with the receptacles during a portion of the advance of the receptacles in the upright position for retaining engagement with the shrimp in the receptacles during which the heads are severed from the shrimp by the severing means.

The novel features which are believed to be characteristic of the invention are set forth with particularity in the appended claims. The invention itself, however, both as to its organization and method of operation may be best understood by reference accompanying drawings in which:

FIG. 1 is a side elevation view, partially broken away, of the shrimp-deheading machine of the invention; and FIG. 2 is a plan view of the machine of FIG. 1.

The shrimp-deheading machine of the invention preferably includes a frame designated generally by the numeral 11 provided with supporting legs 12, 13 at opposite ends on which are supported side members 16, 17 and transversely extending end members 18, 19 as shown in FIG. 2.

The shrimp-deheading machine of the invention includes a plurality of upwardly opening troughlike receptacles 12 having at least one open end and preferably two open ends 12a, 12b. The receptacles 12, each of which is arranged to accommodate a single shrimp such as the shrimp S in the manner shown in FIG. 2, are arranged in an endless row in parallel, side-by-side relationship as shown best in FIG. 1 on supporting means such as an endless chain 21 of conventional construction having interconnected links 21a. As shown, each of the receptacles 12 is secured by suitable means such as welding along its underside to one of the chain links 21a.

Means are provided for continuously advancing the supporting means or chain 21 to move each of the receptacles 12 successively between an upright shrimp receiving position along substantially the entire upper flight of the chain 21 and an inverted discharge position along substantially the entire length of the lower flight of the chain 21 as best shown in FIG. 1. More specifically, the chain 21 is supported for continuous advance on sprockets 22, 23 mounted on shafts 24, 26 rotatably supported at their ends in bearing 27, 28 and 31, 32 respectively. Bearings 27, 28 are preferably supported on a crossmember 33 and bearings 31, 32 are preferably supported on side member 17 and an intermediate longitudinally extending frame member 34.

The sprocket 23 and consequently the chain 21 is arranged to be driven by suitable means such as a drive motor 36 supported on intermediate frame member 34 and provided with an output shaft 37 on which is mounted a pulley 38 connected by means of a belt 39 to a pulley 41 mounted on the input shaft 42 of a gear reducer 43. The gear reducer 43 has an output shaft 46 on which is mounted sprocket 47 connected by means of a chain 48 to a sprocket 49 mounted on the shaft 26 for driving the sprocket 23 and consequently chain 21.

Although shrimp S may be deposited in any suitable manner within receptacles 12 such as manually by an operator, in the illustrated embodiment, means are provided for depositing shrimp S in each of the receptacles in the direction of arrow I in FIG. 1 in the upright position of the receptacles with the head H of the shrimp S extending laterally outward from the receptacle open end 12a as shown in FIG. 2. As is well known, shrimp head H is attached to the shrimp body portion designated by the letter B along a joint which is designated by the letter J in FIG. 2. As will be explained hereinafter, the shrimp S is deposited in each of the receptacles 12 so that joint J coincides substantially with the edge of the receptacle open end 12a as shown.

More specifically, he shrimp-depositing means include a conveyor belt 51 of conventional construction which is provided with a plurality of upstanding, transversely extending cleats 52 arranged in uniformly spaced relationship throughout the length of the belt 51. The belt 51 is supported on peripherally grooved support rollers 53, 54 for continuous advance in the direction of the arrow C, the rollers 53, 54 being mounted on shafts 56, 57 respectively. Shaft 57 is rotatably supported at opposite ends in bearings 58, 59 suitably supported on a crossmember 61 as shown in FIG. 2 and shaft 56 is supported in adjustable devices 62, 63 suitably supported on a crossmember 64 for adjustably maintaining the tension in the belt 51. The belt 51 is arranged to be driven by means of a sprocket 66 connected by means of a chain 67 to sprocket 68 mounted on the shaft 24 in association with the sprocket 22 of the chain 21 so that the advance of the belt 51 is in timed relationship with the chain 21.

The outer surface 51a of the belt 51 is also provided with a continuous index line L which may be formed on the belt 51 in any suitable manner such as by painting, inking or the like. The index line L coincides substantially in longitudinal alignment with the ends 12a of the receptacles so that by placing a single shrimp S in the space or recess between adjacent cleats 52 with the shrimp joint J in overlying vertical alignment with the line L the shrimp S are deposited within the receptacles 12 in the position shown in FIG. 2.

In order to provide a supply of shrimp for the operator a platform or tray 71 is preferably positioned on the frame 11 by suitable support means such as brackets 72, 73. The tray or platform 71 is provided with an open end 71a which is arranged adjacent the conveyor belt 51 as shown best in FIG. 2. In order to deposit the shrimp S from the conveyor belt 51 into the receptacles 12, an inclined plate of slide 74 is positioned, as shown best in FIG. 1 between the front end of the belt 51 and the adjacent rear end of the row of receptacles 12, the supporting means for the slide 74 being omitted for clarity.

The machine of the invention includes shrimp-retaining means for engagement with the shrimp deposited in the receptacles 12. More specifically, the shrimp-retaining means include a rotatably mounted roll 74 the outer periphery of which is provided with a plurality of circumferentially spaced, axially extending grooves 76 which define therebetween a plurality of circumferentially spaced flutes 77 the spacing of which corresponds to the spacing between adjacent receptacles 12 in the upright position of FIG. 1.

Means are provided for moving the shrimp-retaining means or roll 74 into and out of each of the receptacles 12 successively and in timed relationship with the advance of the receptacles in the upright position for retaining engagement with the shrimp S in the receptacles during portion of the advance of the receptacles 12 in the direction of arrow I. More specifically, the fluted roll 74 is rotatably mounted on shaft 78 which is arranged for downward, freely pivotal movement on an arm 79 pivotably mounted on shaft 81 rotatably mounted in a bearing block 82.

Means are provided for rotating the roll 74 in timed relationship with the advance of the receptacles 12. More specifically, as shown best in FIG. 1, a sprocket 84 mounted on a shaft 86 is arranged to engage the links 21a of the chain 21 internally and a gear 87 is also mounted on the shaft 86 for rotation with the sprocket 84 the gear 87 is arranged to mesh with a gear 88 mounted on the shaft 81 on which is also mounted a sprocket 91 driveably connected by means of a chain 92 to a sprocket 93 mounted on the roll shaft 78 for rotating the fluted roll 74 in the direction of the arrow P urging the advance of the chain 21.

Cutting means are positioned adjacent to the receptacles 12 for deheading the shrimp S deposited in the receptacles 12. More specifically, as shown best in FIG. 2, the cutting means include a circular knife 94 mounted on shaft 96 for rotation on a horizontal axis in closely spaced, substantially parallel relationship with the open ends 12a of the receptacles 12. The shaft 96 is suitably supported for rotation in bearings 97, 98 and means are provided for rotating the knife 94 which include a pulley 101 mounted on the end of the shaft 96 opposite the knife 94 and connected by means of a belt 102 to pulley 103 mounted on the gear reducer input shaft 42 drivably connected to the motor drive belt 39 as explained above.

In the operation of the shrimp-deheading machine, the operator removes the shrimp S contained within the tray 71 and deposits one of the shrimp S in each of the recesses 51a defined by the belt cleats 52 with the shrimp joint J in overlying relationship with the index line L as shown in FIG. 1. As the belt 51 moves in the direction of the arrow C, the shrimp S move onto the slide 73 and are successively deposited within the receptacles 12 with the shrimp joint J in substantial alignment with the edge of the receptacles' open ends 12a. As the receptacles containing shrimp S are advanced in direction of the arrow I, each of the flutes 77 on the roll 74 enters one of the receptacle 12 as the roll 74 is rotated by the chain 92 in timed relationship with the advance of the receptacles and the weight of the roll 12 urges the roll pivotally downward as permitted by the arm 79 with each flute 77 in retaining engagement with the shrimp S in the associated receptacle 12 during a portion of the advance of the receptacles 12 on the upright position. The retaining engagement between the flute and shrimp in each receptacle 12 is maintained until the immovably retained shrimp S passes the cutting edge of the rotating knife 94 to sever the shrimp head H from the shrimp body portion B at the joint J with the severed shrimp head H falling downwardly into a chute 106 positioned beneath the knife 94 as shown in FIG. 2 for subsequent disposal of the heads into receptacle or the like.

As the receptacles 12 continue to advance past the knife 94, the retaining engagement between the flute 77 and shrimp S is released as the roll 74 continues to rotate and as each flute 77 moves out of its associated receptacle 12. The shrimp body portion B, which is carried to the front end of the row of receptacles 12, is then discharged from the receptacles as the receptacles move from the upright position along the upper flight of the chain 12 downwardly into an inverted position along the lower flight of the chain 21 for subsequent discharge of the shrimp body portion into a chute 107 for subsequent collection in a receptacle or the like.

It can be seen that there as been provided with a novel arrangement of the invention a machine for deheading shrimp at a high-production rate without mutilation of the edible or body portion of the shrimp and in an accurate manner so that there is virtually no loss of the shrimp edible portion. Shrimp to be deheaded maybe easily be fed into the machine by relatively unskilled operator, the indexing means for the shrimp on the conveyor belt being readily visible to the operator so that every shrimp fed into the machine is properly processed regardless of size and without fail. As a result of the lightweight and simple construction of the machine, its initial cost is extremely low and it is readily portable so that it can be easily transported to various places of use such as on board shrimp boat, at unloading docks and the like. In addition, the rugged construction of the machine prolongs its useful life and makes it relatively free.

While here as been described what at present is considered to be the preferred embodiment of the invention, it will be understood by those skilled in the art that various changes and modifications may be made therein without departing from the invention.

Having thus described the invention, what is claimed is:

1. A shrimp-deheading machine comprising, in combination, the plurality of upwardly opening, troughlike receptacles each having at least one open end having an end edge, means for supporting said plurality of receptacles in an endless row and parallel, side-by-side relationship, means for continuously advancing said supporting means to move each of said receptacles successively between an upright shrimp-receiving position and an inverted discharge position, mechanical means for depositing a shrimp successively in each of said receptacles in times relationship with the advance of said receptacles in said upright position with the joint between the head and body portion of said shrimp in aligned relationhsip with said receptacle end edge and with the head of said shrimp extending laterally outward from said receptacles one open ends, cutting means positioned adjacent said receptacles open ends for deheading shrimp deposited in said receptacles, means engageable with the shrimp deposited in each of said receptacles for retaining said shrimp in an immovable position in said receptacles, means for moving said retaining means into and out of each of said receptacles successively and in timed relationship with the advance of said receptacles in the upright position for retaining engagement with the shrimp in said receptacles during a portion of the advance of said receptacles in said upright position to permit severing by said cutting means of said shrimp heads extending laterally outward from said receptacles.

2. A shrimp-deheading machine in accordance with claim 1 wherein said shrimp-depositing means include an endless conveyor belt having a front end adjacent the rear end of said endless row of receptacles, a plurality of transversely extending, upstanding cleats on the outer surface of said belt, said cleats being arranged in uniformly spaced relationship with adjacent cleats defining therebetween recess for accommodating a shrimp, means for driving said belt in timed relationship with the advance of said receptacles for depositing shrimp successively from said recesses into said receptacles, an index line on said belt outer surface arranged in parallel spaced, adjacent relationship with one side edge of said belt and coinciding substantially in longitudinal alignment with the end edges of said receptacles'one open ends whereby the shrimp placed in said recesses by an operator with the joint between the head and body portion of the shrimp in indexed relationship with said index line are subsequently deposited successively in said receptacles with the heads extending laterally outward from said receptacles'open ends.

3. A shrimp-deheading machine in accordance with claim 2 wherein said shrimp-retaining means include a rotatably mounted roll, said roll having a plurality of circumferentially spaced, longitudinally extending, peripheral grooves, defining therebetween a plurality of longitudinally extending flutes spaced circumferentially so as to correspond to the spacing between adjacent receptacles in said upright position and wherein said means for moving said shrimp-retaining means includes means for downwardly directed, freely pivotal movement and drive means for rotating said roll in timed relationship with the advance of the said receptacles to permit successive flutes on said roll to move into and out of successive receptacles for retaining engagement of the flutes with in the respective receptacles during said portion of the advance of each of said receptacles.

4. A shrimp-deheading machine in accordance with claim 1 wherein said cutting means comprises a circular knife arranged for rotation on a horizontal axis in closely spaced, substantially parallel relationship with said one open ends of said receptacles and means for rotating said knife.

5. A shrimp-deheading machine in accordance with claim 2 including a first chute positioned in underlying relationship with said knife for disposing of said severed shrimp heads and a second chute positioned in underlying relationship with the front end of said endless rows of receptacles for disposing of said shrimp body portions discharged from said receptacles in the said inverted position.

* * * * *